(12) United States Patent
Ishikawa (10) Patent No.: US 12,115,945 B2
(45) Date of Patent: Oct. 15, 2024

(54) WIPER DRIVE DEVICE

(71) Applicant: DENSO ELECTRONICS CORPORATION, Anjo (JP)

(72) Inventor: Taiga Ishikawa, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 144 days.

(21) Appl. No.: 18/074,581

(22) Filed: Dec. 5, 2022

(65) Prior Publication Data

US 2023/0242078 A1 Aug. 3, 2023

(30) Foreign Application Priority Data

Feb. 1, 2022 (JP) ................................. 2022-014171

(51) Int. Cl.
*B60S 1/08* (2006.01)
(52) U.S. Cl.
CPC .................................. *B60S 1/0807* (2013.01)
(58) Field of Classification Search
CPC ......... B60S 1/08; B60S 1/0452; B60S 1/0807
See application file for complete search history.

(56) References Cited

U.S. PATENT DOCUMENTS

| | | | | |
|---|---|---|---|---|
| 4,731,566 A | * | 3/1988 | Takaishi | B60S 1/482 318/DIG. 2 |
| 4,947,092 A | * | 8/1990 | Nabha | B60S 1/482 318/434 |
| 5,241,248 A | * | 8/1993 | Furukoshi | B60S 1/0807 318/DIG. 2 |
| 6,362,587 B1 | * | 3/2002 | Hutter | B60S 1/08 318/446 |
| 7,748,075 B2 | * | 7/2010 | Nakano | B60S 1/486 318/443 |
| 2002/0011812 A1 | | 1/2002 | Yabe | |

FOREIGN PATENT DOCUMENTS

JP          2002-037032 A       2/2002

* cited by examiner

*Primary Examiner* — Thai T Dinh
(74) *Attorney, Agent, or Firm* — Harness, Dickey & Pierce, P.L.C.

(57) ABSTRACT

A wiper drive device includes: a wiring connected to a wiper motor; a drive element configured to apply a voltage to the wiper motor through the wiring by being turned on so as to rotate the wiper motor; a braking element configured to brake the wiper motor by being turned on when the drive element is turned off so as to flow a current corresponding to a rotational energy of the wiper motor; and a determination unit configured to determine that the braking element is abnormal when a time period from when the wiper motor is braked to when an electric potential of the wiring becomes equal to or less than a predetermined threshold potential is longer than a predetermined value which is the time period in case where the braking element is normal.

4 Claims, 3 Drawing Sheets

WIPER DRIVE DEVICE

CROSS REFERENCE TO RELATED APPLICATION

This application is based on Japanese Patent Application No. 2022-014171 filed on Feb. 1, 2022, the disclosure of which is incorporated herein by reference.

TECHNICAL FIELD

The present disclosure relates to a wiper drive device.

BACKGROUND

A wiper control device has a wiper motor, a first semiconductor switch element, a second semiconductor switch element, and a controller. The first semiconductor switch element turns on and off power supply to the wiper motor. The second semiconductor switch element is disposed for braking by a reverse current flowing through the wiper motor when power to the wiper motor is turned off. The controller controls the first and second semiconductor switch elements.

SUMMARY

A wiper drive device includes: a wiring connected to a wiper motor; a drive element configured to apply a voltage to the wiper motor through the wiring by being turned on so as to rotate the wiper motor; a braking element configured to brake the wiper motor by being turned on when the drive element is turned off so as to flow a current corresponding to a rotational energy of the wiper motor; and a determination unit configured to determine that the braking element is abnormal when a time period from when the wiper motor is braked to when an electric potential of the wiring becomes equal to or less than a predetermined threshold potential is longer than a predetermined value which is the time period when the braking element is normal.

A wiper drive device includes: a wiring connected to a wiper motor; a drive element configured to apply a voltage to the wiper motor through the wiring by being turned on so as to rotate the wiper motor; a braking element configured to brake the wiper motor by being turned on when the drive element is turned off so as to flow a current corresponding to a rotational energy of the wiper motor; and a determination unit configured to determine that the braking element is abnormal when an amount of decrease in an electric potential of the wiring per unit time after braking the wiper motor is equal to or less than a predetermined value smaller than the amount of decrease when the braking element is normal.

DETAILED DESCRIPTION

To begin with, examples of relevant techniques will be described. Conventionally, a wiper control device has a wiper motor, a first semiconductor switch element, a second semiconductor switch element, and a controller. The first semiconductor switch element turns on and off power supply to the wiper motor. The second semiconductor switch element turns on a closed circuit, for braking by a reverse current flowing through the wiper motor when power to the wiper motor is turned off. The controller controls the first and second semiconductor switch elements. According to the study by the inventor, in the wiper control device, by detecting the voltage applied to the wiper motor during braking, it is possible to detect an abnormality such as the inability to turn on the second semiconductor switch element. However, since the wiper motor has a relatively low impedance, the voltage applied to the wiper motor at a stop time is the same as the voltage applied to the ground or the like connected to the wiper motor. Therefore, the amount of change in the voltage applied to the wiper motor is relatively small at a stop time. It is difficult to detect an abnormality in the semiconductor switch element only by detecting the voltage applied to the wiper motor at a stop time and comparing the detected voltage with a threshold value. The present disclosure provides a wiper drive device that can easily detect an abnormality in an element that brakes a wiper motor.

According to a first aspect, a wiper drive device includes: a wiring connected to a wiper motor; a drive element configured to apply a voltage to the wiper motor through the wiring by being turned on so as to rotate the wiper motor; a braking element configured to brake the wiper motor by being turned on when the drive element is turned off so as to flow a current corresponding to a rotational energy of the wiper motor; and a determination unit configured to determine that the braking element is abnormal when a time period from when the wiper motor is braked to when an electric potential of the wiring becomes equal to or less than a predetermined threshold potential is longer than a predetermined value which is the time period when the braking element is normal.

Thereby, the abnormality of the braking element is determined based on the time period until the potential of the wiring becomes equal to or lower than the predetermined threshold potential. Therefore, it is easier to determine whether the braking element is abnormal, compared to a case where the braking element is determined to be abnormal based on only the potential of the wiring connected to the wiper motor.

According to a second aspect, a wiper drive device includes: a wiring connected to a wiper motor; a drive element configured to apply a voltage to the wiper motor through the wiring by being turned on so as to rotate the wiper motor; a braking element configured to brake the wiper motor by being turned on when the drive element is turned off so as to flow a current corresponding to a rotational energy of the wiper motor; and a determination unit configured to determine that the braking element is abnormal when an amount of decrease in an electric potential of the wiring per unit time after braking the wiper motor is equal to or less than a predetermined value smaller than the amount of decrease when the braking element is normal.

As a result, the abnormality of the braking element is determined based on the amount of decrease in the potential of the wiring per unit time. Therefore, it is easier to determine whether the braking element is abnormal, compared to a case where the braking element is determined to be abnormal based on only the potential of the wiring connected to the wiper motor.

A reference numeral attached to each component or the like indicates an example of correspondence between the component or the like and specific component or the like described in an embodiment below.

Hereinafter, an embodiment will be described with reference to the drawings. In the following embodiment, portions that are mutually the same or equivalent are denoted by the same reference signs, and the description thereof will be omitted.

A wiper drive device 30 of the present embodiment is used in a wiper drive system 1 of a vehicle. First, the wiper drive system 1 will be described.

Figure 1:
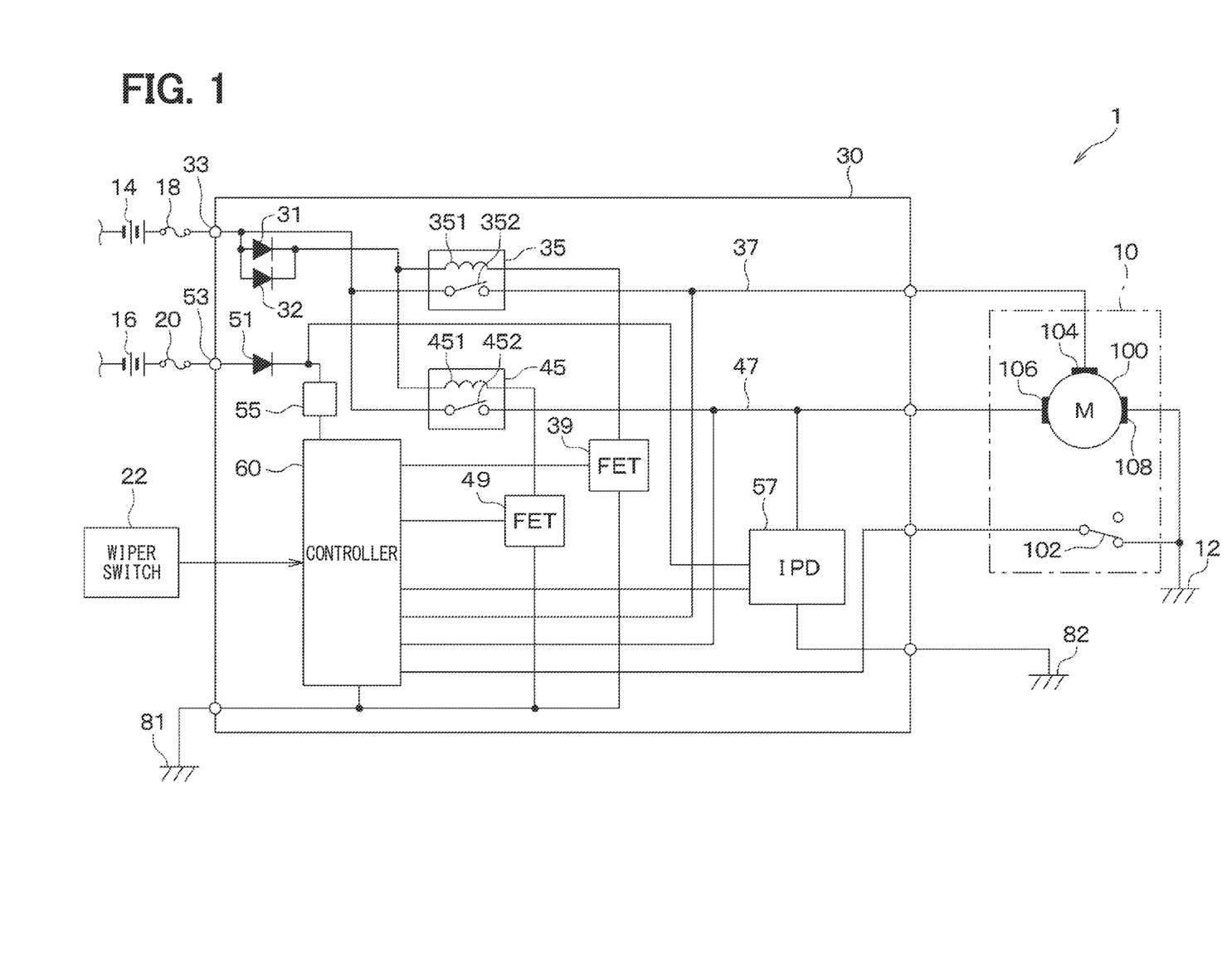
FIG. 1 is a configuration diagram of a wiper drive system using a wiper drive device according to an embodiment.

As shown in FIG. 1, the wiper drive system 1 includes a motor unit 10, a motor ground 12, a motor battery 14, a control battery 6, a motor fuse 18 and a control fuse 20, The wiper drive system 1 further includes a wiper switch 22, the wiper drive device 30, a first ground 81 and a second ground 82.

The motor unit 10 has a wiper motor 100 and a cam switch 102. The wiper motor 100 includes a Hi terminal 104, a Lo terminal 106 and a GND terminal 108. The Hi terminal 104 and the Lo terminal 106 are connected to the wiper drive device 30 which will be described later. The GND terminal 108 is connected to the motor ground 12. The wiper motor 100 rotates at a relatively high speed when the Hi terminal 104 is energized. When the Lo terminal 106 is energized, the wiper motor 100 rotates at a lower speed than when the Hi terminal 104 is energized. The rotation of the wiper motor 100 rotates wipers (not shown) of the vehicle.

The cam switch 102 is turned on and off by the rotation of the wiper motor 100. When the cam switch 102 is turned off, the wiper drive device 30 (to be described later) is electrically connected with the GND terminal 108 and the motor ground 12. Further, when the cam switch 102 is turned on, the wiper drive device 30 is electrically disconnected from the GND terminal 108 and the motor ground 12.

The motor battery 14 and the control battery 16 are secondary batteries such as lithium-ion batteries, nickel-metal hydride batteries, and lead-acid batteries. The voltages of the motor battery 14 and the control battery 16 are, for example, 12V. One end of the motor battery 14 and one end of the control battery 6 are connected to the ground (not shown).

One end of the motor fuse 18 is connected to the other end of the motor battery 14. The other end of the motor fuse 18 is connected to the wiper drive device 30. The motor fuse 18 prevents overcurrent from flowing from the motor battery 14 to the wiper motor 100 via the wiper drive device 30.

One end of the control fuse 20 is connected to the other end of the control battery 16. The other end of the control fuse 20 is connected to the wiper drive device 30, The control fuse 20 prevents overcurrent from flowing from the control battery 16 to the IPD 57 and controller 60 of the wiper drive device 30.

The wiper switch 22 is operated by an operator to output a signal to the controller 60 of the wiper drive device 30 so as to set the operating state of the wiper to one of a continuous high-speed mode, a continuous low-speed mode, and an intermittent mode.

The wiper drive device 30 controls the wiper motor 100 by controlling the voltage applied to wiper motor 100. Thereby, the wiper drive device 30 controls the driving of the wiper connected to the wiper motor 100. Specifically, the wiper drive device 30 has a first motor diode 31, a second motor diode 32, a motor power supply terminal 33, a Hi relay 35, a Hi wiring 37 and a Hi FET 39. The wiper drive device 30 has a Lo relay 45, a Lo wiring 47, a Lo FET 49, a control diode 51, a control power supply terminal 53, a step-down converter 55, the IPD 57 and the controller 60. Note that IPD is an abbreviation for Intelligent Power Device.

The anode of the first motor diode 31 is connected to the other end of the motor fuse 18 via the motor power supply terminal 33, A cathode of the first motor diode 31 is connected to one end of a Hi coil 351 of the Hi relay 35. The first motor diode 31 suppresses current from flowing from the wiper drive device 30 to the motor battery 14.

The anode of the second motor diode 32 is connected to the other end of the motor fuse 18 via the motor power supply terminal 33. The cathode of the second motor diode 32 is connected to one end of the Hi coil 351 of the Hi relay 35. The second motor diode 32 suppresses current from flowing from the wiper drive device 30 to the motor battery 14. The second motor diode 32 is connected in parallel with the first motor diode 31. Therefore, even if one of the first motor diode 31 and the second motor diode 32 fails, voltage can be supplied from the motor battery 14 to the Hi coil 351 and the Lo coil 451.

The Hi relay 35 includes the Hi coil 351 and the Hi switch 352. One end of the Hi coil 351 is connected to the cathode of the first motor diode 31 and the cathode of the second motor diode 32. The Hi switch 352 is turned on and off by electromagnetic force generated by the current flowing through the Hi coil 351. One end of the Hi switch 352 is connected to the other end of the motor fuse 18 via the motor power supply terminal 33. The other end of the Hi switch 352 is connected to the Hi terminal 104 via the Hi wiring 37.

The Hi FET 39 corresponds to a drive element such as an N-channel MOSFET. The drain of the Hi FET 39 is connected to the other end of the Hi coil 351. The source of the Hi FET 39 is connected to the first ground 81. The gate of the Hi FET 39 is connected to the controller 60.

The Lo relay 45 includes the Lo coil 451 and the Lo switch 452. One end of the Lo coil 451 is connected to the cathode of the first motor diode 31 and the cathode of the second motor diode 32. The Lo switch 452 is turned on and off by electromagnetic force generated by the current flowing through the Lo coil 451. One end of the Lo switch 452 is connected to the other end of the motor fuse 18 via the motor power supply terminal 33. The other end of the Lo switch 452 is connected to the Lo terminal 106 via the Lo wiring 47.

The Lo FET 49 corresponds to a drive element such as an N-channel MOSFET. The drain of the Lo FET 49 is connected to the other end of the Lo coil 451. The source of the Lo FET 49 is connected to the first ground 81. The gate of the La FET 49 is connected to the controller 60.

The anode of the control diode 51 is connected to the other end of the control fuse 20 via the control power supply terminal 53. The cathode of the control diode 51 is connected to the step-down converter 55 and the IPD 57. The control diode 51 suppresses current from flowing from the wiper drive device 30 to the control battery 16.

The step-down converter 55 is connected to the cathode of the control diode 51 and the controller 60. The step-down converter 55 steps down the voltage of 12V applied to the step-down converter 55 from the control battery 16 via the control fuse 20, the control power supply terminal 53 and the control diode 51 to, for example, 5V. Then, the step-down converter 55 applies the stepped-down voltage to the controller 60.

The IPD 57 corresponds to a braking element and has an FET, a protection circuit, and the like. The FET of the IPD 57 is, for example, an N-channel MOSFET. The drain of the FET of the IPD 57 is connected to the Lo wiring 47. The source of the FET of the IPD 57 is connected to the second ground 82. The gate of the FET of the IPD 57 is connected to the controller 60. The protection circuit of the IPD 57 is connected to the cathode of the control diode 51. The protection circuit of the IPD 57 is driven by the voltage from the control battery 16 to protect the FET of the IPD 57.

The controller 60 corresponds to a determination unit, and is mainly composed of a microcomputer, and includes a CPU, a ROM, a flash memory, a RAM, an I/O, a drive circuit, an A/D converter, and a bus line connecting them. The controller 60 is driven by the voltage from the step-down converter 55. The controller 60 controls the voltage applied to the wiper motor 100 based on the signal from the wiper switch 22 by executing the program stored in the ROM. As a result, the operating state of the wiper is one of the continuous high-speed mode, the continuous low-speed mode and the intermittent mode. Further, the controller 60 determines whether or not the FET of the IPD 57 is abnormal based on the potentials of the Hi wiring 37 and the Lo wiring 47 by executing the program stored in the ROM.

The wiper drive system 1 is configured as described above. Next, it will be described how the controller 60 controls the wiper motor 100 to change the operating state of the wiper to the continuous high-speed mode, the continuous low-speed mode, and the intermittent mode.

(Continuous High-Speed Mode)

When the wiper switch 22 is operated by the operator to output a signal to change the operating state of the wiper to the continuous high-speed mode to the controller 60, the controller 60 changes the voltage level of the gate voltage of the Hi FET 39 from the low level to the high level. As a result, the Hi FET 39 is turned on. Accordingly, a current flows from the motor battery 14 to the first ground 81 via the motor fuse 18, the motor power supply terminal 33, the first motor diode 31, the second motor diode 32, the Hi coil 351 and the Hi FET 39. At this time, since a current flows through the Hi coil 351, the Hi switch 352 is turned on. Therefore, voltage is applied to the wiper motor 100 from the motor battery 14 via the motor power supply terminal 33, the Hi switch 352, the Hi wiring 37 and the Hi terminal 104. As a result, the wiper motor 100 rotates at a higher speed than when the Lo terminal 106 is energized. Therefore, the wiper (not shown) connected to the wiper motor 100 rotates at a high speed, so that the operating state of the wiper becomes the continuous high-speed mode. At this time, the Lo FET 49 is turned off. Therefore, since no current flows through the Lo coil 451, the Lo switch 452 is turned off. Also, the FET of the IPD 57 is turned off.

(Continuous Low-Speed Mode)

When the wiper switch 22 is operated by the operator to output a signal to change the operating state of the wiper to the continuous low-speed mode to the controller 60, the controller 60 changes the voltage level of the gate voltage of the Lo FET 49 from the low level to the high level. As a result, the Lo FET 49 is turned on. Accordingly, a current flows from the motor battery 14 to the first ground 81 via the motor fuse 18, the motor power supply terminal 33, the first motor diode 31, the second motor diode 32, the Lo coil 451 and the Lo FET 49. At this time, since a current flows through the Lo coil 451, the Lo switch 452 is turned on. Therefore, voltage is applied from the motor battery 14 to the wiper motor 100 via the motor power supply terminal 33, the La switch 452, the Lo wiring 47 and the Lo terminal 106. As a result, the wiper motor 100 rotates at a lower speed than when the Hi terminal 104 is energized. Therefore, when the wiper (not shown) connected to the wiper motor 100 rotates at low speed, the operating state of the wiper becomes the continuous low-speed mode. At this time, the Hi FET 39 is turned off. Therefore, since no current flows through the Hi coil 351, the Hi switch 352 is turned off. Also, the FET of the IPD 57 is turned off.

(Intermittent Mode)

Figure 2:
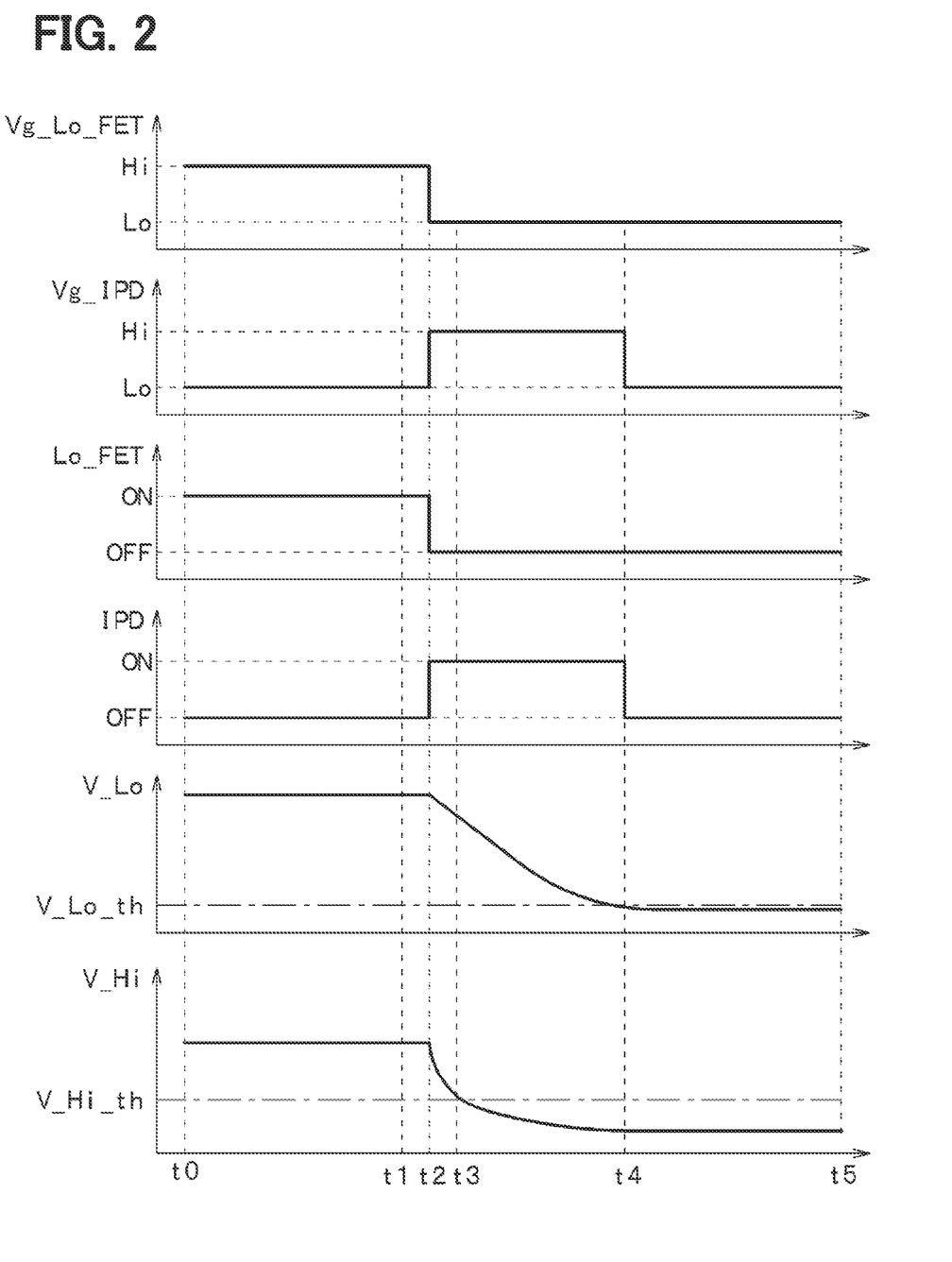
FIG. 2 is a time chart showing processing when the wiper operating state is set to an intermittent mode.

Next, the intermittent mode, which is the operation state of the wiper set by the controller 60 by controlling the wiper motor 100, will be described with reference to the time chart of FIG. 2.

During the period from time t0 to time t1, when the wiper switch 22 is operated by the operator to output a signal to change the operation state of the wiper to the intermittent mode to the controller 60, the controller 60 changes the gate voltage of the Lo FET 49 from the low level to the high level. As a result, the Lo FET 49 is turned on. Accordingly, a current flows from the motor battery 14 to the first ground 81 via the motor fuse 18, the motor power supply terminal 33, the first motor diode 31, the second motor diode 32, the Lo coil 451 and the Lo FET 49. At this time, since a current flows through the Lo coil 451, the Lo switch 452 is turned on. Therefore, voltage is applied from the motor battery 14 to the wiper motor 100 via the motor power supply terminal 33, the Lo switch 452, the Lo wiring 47 and the Lo terminal 106. As a result, the wiper motor 100 rotates at a lower speed than when the Hi terminal 104 is energized. Therefore, the wiper (not shown) connected to the wiper motor 100 rotates at a low speed. In FIG. 2, the Lo FET 49 is shown as Lo_FET. The gate voltage of the Lo FET 49 is shown as Vg_Lo_FET. At this time, the controller 60 sets the voltage level of the gate voltage of the FET of the IPD 57 to the low level. Therefore, the FET of the IPD 57 is turned off. Further, in FIG. 2, the gate voltage of the FET of the IPD 57 is shown as Vg_IPD. The controller 60 sets the voltage level of the gate voltage of the Hi FET 39 to the low level. As a result, the Hi FET 39 is turned off. Therefore, since no current flows through the Hi coil 351, the Hi switch 352 is turned off.

Further, at this time, the rotation of the wiper motor 100 turns on the cam switch 102. Therefore, the wiper drive device 30 is electrically disconnected from the GND terminal 108 and the motor ground 12.

The potential of the Lo wiring 47 is approximately the same as the potential of the motor battery 14. Since the Hi wiring 37 is connected to the Lo wiring 47 via the wiper motor 100, the potential of the Hi wiring 37 is lower than the potential of the Lo wiring 47 by the voltage drop caused by the wiper motor 100. Note that the potential of the Lo wiring 47 is indicated as V_Lo and that the potential of the Hi wiring 37 is indicated as V_Hi, in FIG. 2.

During the period from time t1 to time t2, the wiper switch 22 outputs a signal to the controller 60 to change the operating state of the wiper to the intermittent mode. The rotation of the wiper motor 100 turns the cam switch 102 from ON to OFF. Thereby, the wiper drive device 30 is electrically connected to the GND terminal 108 and the motor ground 12. Then, the controller 60 acquires the potential of the cam switch 102. Further, the controller 60 determines whether or not the acquired potential of the cam switch 102 is the potential of the motor ground 12. Further, based on the determination, the controller 60 turns the La FET 49 from ON to OFF, and turns the FET of the IPD 57 from OFF to ON.

However, at this time, since the potential of the cam switch 102 is not the potential of the motor ground 12, the controller 60 keeps the voltage level of the gate voltage of the Lo FET 49 at the high level. As a result, the Lo FET 49 is turned on. Accordingly, a current flows from the motor battery 4 to the first ground 81 via the motor fuse 18, the motor power supply terminal 33, the first motor diode 31, the second motor diode 32, the Lo coil 451 and the La FET 49. Since a current is flowing through the Lo coil 451, the Lo switch 452 is turned on. Therefore, voltage is applied to the wiper motor 100 from the motor battery 14 via the motor power supply terminal 33, the Lo switch 452, the Lo wiring 47 and the Lo terminal 106. As a result, the wiper motor 100 rotates at a lower speed than when the Hi terminal 104 is energized. Therefore, the wiper (not shown) connected to the wiper motor 100 rotates at a low speed.

The potential of the Lo wiring 47 is approximately the same as the potential of the motor battery 14. Furthermore, since the Hi wiring 37 is connected to the Lo wiring 47 via the wiper motor 100, the potential of the Hi wiring 37 is lower than the potential of the Lo wiring 47 by the voltage drop caused by the wiper motor 100.

During the period from time t2 to time t3, the wiper switch 22 outputs a signal to the controller 60 to change the operation state of the wiper to the intermittent mode. Also, the rotation of the wiper motor 100 turns off the cam switch 102. Thereby, the wiper drive device 30 is electrically connected with the GND terminal 108 and the motor ground 12. Then, the controller 60 acquires the potential of the cam switch 102.

At this time, since the potential of the cam switch 102 becomes the potential of the motor ground 12, the controller 60 changes the voltage level of the gate voltage of the Lo FET 49 from the high level to the low level. As a result, the Lo FET 49 is turned off. Accordingly, a current does not flow from the motor battery 14 to the first ground 81 via the motor fuse 18, the motor power supply terminal 33, the first motor diode 31, the second motor diode 32, the Lo coil 451 and the Lo FET 49. At this time, since no current flows through the Lo coil 451, the Lo switch 452 is turned off. Therefore, no voltage is applied from the motor battery 14 to the wiper motor 100 via the motor power supply terminal 33, the Lo switch 452, the Lo wiring 47 and the Lo terminal 106. Thus, the potential of the Lo wiring 47 decreases. Since the Hi wiring 37 is connected to the Lo wiring 47 via the wiper motor 100, the potential of the Lo wiring 47 decreases. Thus, the potential of the Hi wiring 37 also decreases.

At this time, the wiper motor 100 is rotating due to inertia. Therefore, the wiper (not shown) connected to the wiper motor 100 rotates due to inertia.

Further, at this time, the controller 60 changes the voltage level of the gate voltage of the FET of the IPD 57 from the low level to the high level. As a result, the FET of the IPD 57 is turned ON from OFF. Therefore, a current corresponding to the inertial rotational energy of the wiper motor 100 flows from the wiper motor 100 to the second ground 82 via the IPD 57. As a result, the electric energy corresponding to the inertial rotational energy of the wiper motor 100 is reduced, so that the wiper motor 100 is braked.

During the period from time t3 to time t4, the wiper switch 22 outputs a signal to the controller 60 to change the operating state of the wiper to the intermittent mode. The rotation of the wiper motor 100 turns off the cam switch 102. Thereby, the wiper drive device 30 is electrically connected with the GND terminal 108 and the motor ground 12. Then, the controller 60 acquires the potential of the cam switch 102.

At this time, since the potential of the cam switch 102 is the potential of the motor ground 12, the controller 60 sets the voltage level of the gate voltage of the Lo FET 49 to the low level. As a result, the Lo FET 49 is turned off. Accordingly, a current does not flow from the motor battery 14 to the first ground 81 via the motor fuse 18, the motor power supply terminal 33, the first motor diode 31, the second motor diode 32, the Lo coil 451 and the Lo FET 49. Since no current flows through the Lo coil 451 at this time, the Lo switch 452 is turned off. Therefore, no voltage is applied to the wiper motor 100 from the motor battery 14 via the motor power supply terminal 33, the La switch 452, the Lo wiring 47 and the Lo terminal 106. Thus, the potential of the Lo wiring 47 decreases. Since the Hi wiring 37 is connected to the Lo wiring 47 via the wiper motor 100, the potential of the Lo wiring 47 decreases, and the potential of the Hi wiring 37 also decreases to be equal to or lower than a Hi predetermined threshold potential V_Hi_th. Note that the Hi predetermined threshold potential V_Hi_th is the potential of the Hi wiring 37 when the wiper motor 100 rotating by inertia stops, and is, for example, 1.0V.

At this time, the wiper motor 100 stops rotating, and the position of the wiper motor 100 returns to the initial position and the position of the wiper (not shown) connected to the wiper motor 100 returns to the initial position.

Furthermore, at this time, the controller 60 keeps the voltage level of the gate voltage of the FET of the IPD 57 at the high level. Thereby, the FET of the IPD 57 is turned on. Therefore, a current corresponding to the inertial rotational energy of the wiper motor 100 flows from the wiper motor 100 to the second ground 82 via the IPD 57. As a result, the electric energy corresponding to the inertial rotational energy of the wiper motor 100 is reduced, so that the wiper motor 100 is braked.

During the period from time t4 to time t5, the wiper switch 22 outputs a signal to the controller 60 to change the operating state of the wiper to the intermittent mode. Moreover, the cam switch 102 is turned off since the wiper motor 100 is stopped. Thereby, the wiper drive device 30 is electrically connected with the GND terminal 108 and the motor ground 12. Then, the controller 60 acquires the potential of the cam switch 102.

At this time, since the potential of the cam switch 102 is the potential of the motor ground 12, the controller 60 changes the voltage level of the gate voltage of the Lo FET 49 from the high level to the low level. As a result, the Lo FET 49 is turned off. Accordingly, a current does not flow from the motor battery 4 to the first ground 81 via the motor fuse 18, the motor power supply terminal 33, the first motor diode 31, the second motor diode 32, the Lo coil 451 and the Lo FET 49. Since no current flows through the Lo coil 451 at this time, the Lo switch 452 is turned off. Therefore, no voltage is applied to the wiper motor 100 from the motor battery 4 via the motor power supply terminal 33, the Lo switch 452, the Lo wiring 47 and the Lo terminal 106. Thus, the potential of the Lo wiring 47 decreases to be equal to or lower than a Lo predetermined threshold potential V_Lo_th. The Hi wiring 37 is connected to the Lo wiring 47 via the wiper motor 100, and the potential of the Lo wiring 47 decreases, so that the potential of the Hi wiring 37 decreases and becomes less than the Hi predetermined threshold potential V_Hi_th. The Lo predetermined potential V_Lo_th is the potential of the Lo wiring 47 when the wiper motor 100 rotating by inertia stops, and is, for example, 1.0V.

At this time, since the wiper motor 100 has stopped rotating, the wiper motor 100 returns to the initial position and the wiper (not shown) connected to the wiper motor 100 returns to the initial position.

Furthermore, at this time, the controller 60 changes the voltage level of the gate voltage of the FET of the IPD 57 from the high level to the low level. Thereby, the FET of the IPD 57 is turned off.

After time t5, the wiper switch 22 outputs a signal to the controller 60 to change the operation state of the wiper to the intermittent mode. Since the wiper motor 100 is stopped, the cam switch 102 is turned off.

At this time, the controller 60 performs the same processing as at time to. Specifically, the controller 60 changes the voltage level of the gate voltage of the Lo FET 49 from the low level to the high level. As a result, the Lo FET 49 is turned on. Accordingly, a current flows from the motor battery 4 to the first ground 81 via the motor fuse 18, the motor power supply terminal 33, the first motor diode 31, the second motor diode 32, the Lo coil 451 and the Lo FET 49. At this time, since a current flows through the Lo coil 451, the Lo switch 452 is turned on. Therefore, voltage is applied from the motor battery 14 to the wiper motor 100 via the motor power supply terminal 33, the Lo switch 452, the La wiring 47 and the Lo terminal 106. As a result, the wiper motor 100 rotates at a lower speed than when the Hi terminal 104 is energized. Therefore, the wiper connected to the wiper motor 100 rotates at a low speed. After that, the controller 60 repeats the same processing as the processing during the period from time to t0 time t5, thereby intermittently rotating the wiper motor 100 and the wiper connected to the wiper motor 100. In this way, the operating state of the wiper is in the intermittent mode.

As described above, the controller 60 controls the wiper motor 100 to set the wiper operating state to one of the continuous high-speed mode, the continuous low-speed mode, and the intermittent mode. Based on the potentials of the Hi wiring 37 and the Lo wiring 47, the wiper drive device 30 of the present embodiment easily detects an abnormality in which the FET of the IPD 57 cannot be turned on as a switching element for braking the wiper motor 100, as follows.

Figure 3:
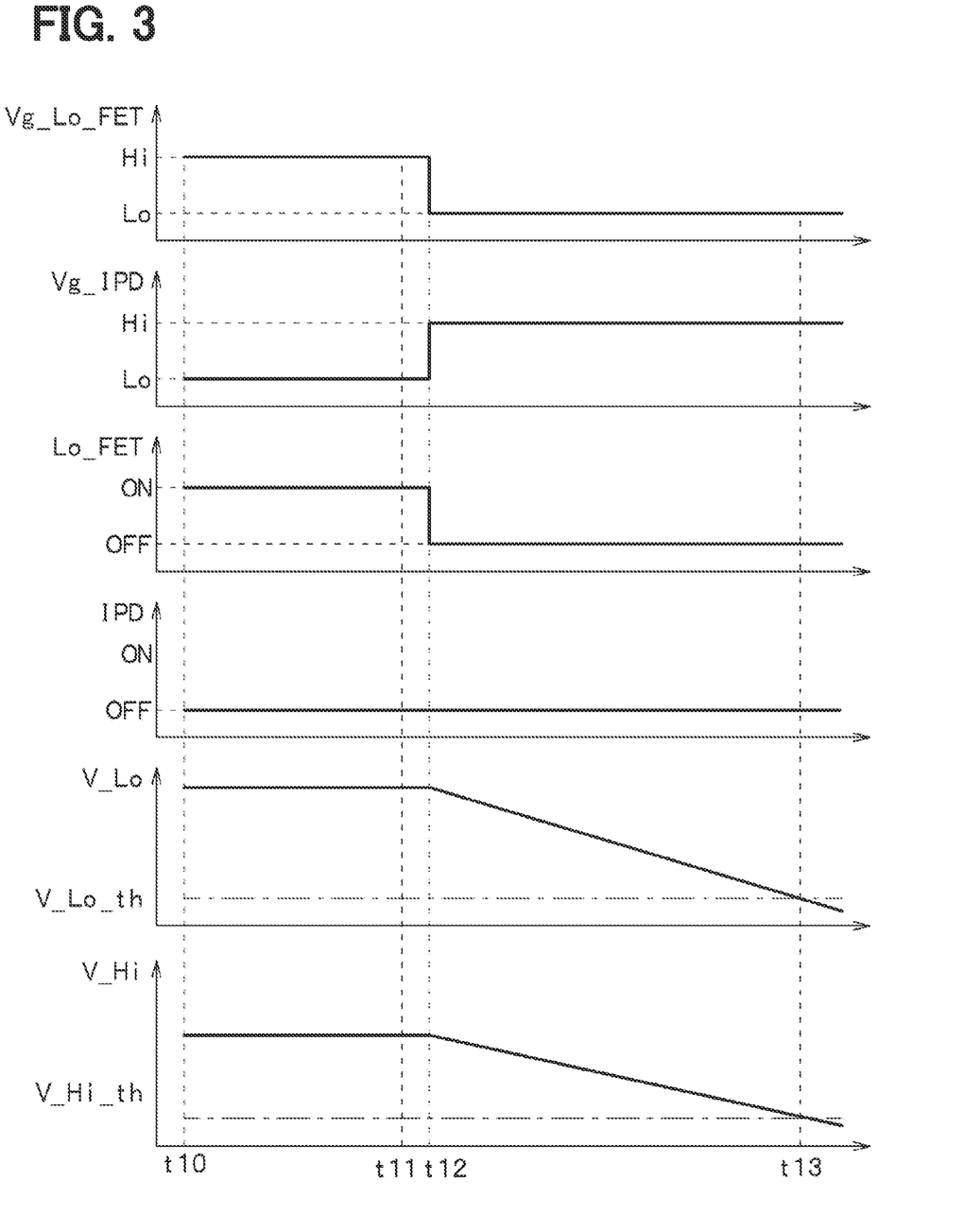
FIG. 3 is a time chart showing a state in which the IPD of the wiper drive device is abnormal.

Here, the case where the FET of the IPD 57 cannot be turned on will be described with reference to the time chart of FIG. 3. In the period from time t10 to time t12 in FIG. 3, the same processing as the period from time t0 to time t2 is performed, so the explanation is omitted.

During the period from time t12 to time t13, the wiper switch 22 outputs a signal to the controller 60 to change the operation state of the wiper to the intermittent mode. Also, the rotation of the wiper motor 100 turns off the cam switch 102, Thereby, the wiper drive device 30 is electrically connected with the GND terminal 108 and the motor ground 12. Then, the controller 60 acquires the potential of the cam switch 102.

At this time, since the potential of the cam switch 102 becomes the potential of the motor ground 12, the controller 60 changes the voltage level of the gate voltage of the Lo FET 49 from the high level to the low level. As a result, the Lo FET 49 is turned off. Accordingly, a current does not flow from the motor battery 14 to the first ground 81 via the motor fuse 18, the motor power supply terminal 33, the first motor diode 31, the second motor diode 32, the Lo coil 451 and the Lo FET 49. At this time, since no current flows through the Lo coil 451, the Lo switch 452 is turned off. Therefore, no voltage is applied from the motor battery 14 to the wiper motor 100 via the motor power supply terminal 33, the Lo switch 452, the Lo wiring 47 and the Lo terminal 106. Therefore, the potential of the Lo wiring 47 decreases. Also, since the Hi wiring 37 is connected to the Lo wiring 47 via the wiper motor 100 and the potential of the Lo wiring 47 decreases, the potential of the Hi wiring 37 also decreases.

At this time, the wiper motor 100 is rotating due to inertia. Therefore, the wiper (not shown) connected to the wiper motor 100 rotates due to inertia.

Further, at this time, the controller 60 changes the voltage level of the gate voltage of the FET of the IPD 57 from the low level to the high level. However, the FET of the IPD 57 is not turned on due to an abnormality. Therefore, the wiper motor 100 and the second ground 82 are electrically disconnected. Therefore, the current corresponding to the inertial rotational energy of the wiper motor 100 does not flow from the wiper motor 100 to the second ground 82 via the IPD 57. Therefore, the wiper motor 100 is not braked by the flow of current corresponding to the inertial rotational energy of the wiper motor 100. Instead, the wiper motor 100 and the wiper connected to the wiper motor 100 are braked due to friction with an object, such as a windshield, that is in contact with the wiper. Therefore, the amount of decrease in electrical energy corresponding to the inertial rotational energy of wiper motor 100 is smaller than at time t2. Therefore, at this time, the amount of decrease in the potential of the Lo wiring 47 and the Hi wiring 37 connected to wiper motor 100 is smaller than at time t2.

After time t13, the wiper switch 22 outputs a signal to the controller 60 to change the operation state of the wiper to the intermittent mode. Also, the rotation of the wiper motor 100 turns off the cam switch 102. Thereby, the wiper drive device 30 is electrically connected with the GND terminal 108 and the motor ground 12. Then, the controller 60 acquires the potential of the cam switch 102.

At this time, since the potential of the cam switch 102 is the potential of the motor ground 12, the controller 60 sets the voltage level of the gate voltage of the Lo FET 49 to the low level. As a result, the La FET 49 is turned off. Accordingly, a current does not flow from the motor battery 4 to the first ground 81 via the motor fuse 18, the motor power supply terminal 33, the first motor diode 31, the second motor diode 32, the La coil 451 and the La FET 49. Since no current flows through the La coil 451 at this time, the La switch 452 is turned off. Therefore, no voltage is applied to the wiper motor 100 from the motor battery 14 via the motor power supply terminal 33, the Lo switch 452, the La wiring 47 and the Lo terminal 106. Thus, the potential of the La wiring 47 decreases to be equal to or lower than the Lo predetermined threshold potential V_Lo_th. In addition, since the Hi wiring 37 is connected to the Lo wiring 47 via the wiper motor 100, and the potential of the Lo wiring 47 decreases, the potential of the Hi wiring 37 also decreases to be equal to or lower than the Hi predetermined threshold potential V_Hi_th.

At this time, since the wiper motor 100 stops rotating, the wiper connected to the wiper motor 100 stops.

Therefore, since the amount of decrease in the potential of the Lo wiring 47 and the Hi wiring 37 is smaller than that at time t2, the time period from time t12 to time t13 is longer than the time period from time t2 to time t3 and the time period from time t2 to time t4. That is, when the FET of the IPD 57 is abnormal, the time period from when the wiper motor 100 starts braking until the potential of the Lo wiring 47 becomes equal to or lower than the Lo predetermined threshold potential V_Lo_th is longer than when the FET of the IPD 57 is normal. When the FET of the IPD 57 is abnormal, the time period from when the wiper motor 100 starts braking until the potential of the Hi wiring 37 becomes equal to or lower than the Hi predetermined threshold V_Hi_th is longer than when the FET of the IPD 57 is normal.

Therefore, in the wiper drive device 30 of the present embodiment, the controller 60 determines whether the time period from when the wiper motor 100 starts braking until the potential of the Lo wiring 47 becomes equal to or lower than the Lo threshold potential V_Lo_th to be equal to or longer than a predetermined time period for Lo. Thereby, the controller 60 determines whether the FET of the IPD 57 is abnormal. The predetermined time period for Lo is longer than the time period from when the wiper motor 100 starts braking until the potential of the Lo wiring 47 becomes equal to or lower than the Lo threshold potential V_Lo_th in case where the FET of the IPD 57 is normal. The predetermined time period for La is set through experiments, simulations, or the like so as to achieve such a result.

When the time period from the start of braking of the wiper motor 100 until the potential of the Lo wiring 47 becomes equal to or less than the Lo threshold potential V_Lo_th is longer than the predetermined time period for Lo, the time period is long due to an abnormality in the FET of the IPD 57. Therefore, at this time, the controller 60 determines that the FET of the IPD 57 is abnormal. Further, when the time period from when the wiper motor 100 starts braking until the potential of the Lo wiring 47 becomes equal to or lower than the Lo threshold potential V_Lo_th is shorter than the predetermined time period for Lo, the FET of the IPL 57 is normal. Therefore, at this time, the controller 60 determines that the FET of the IPS 57 is normal.

Further, the controller 60 determines whether or not the time period from when the wiper motor 100 starts braking until the potential of the Hi wiring 37 becomes equal to or less than the Hi threshold potential V_Hi_th is equal to or longer than a predetermined time period for Hi. Thereby, the controller 60 determines that the FET of the IPD 57 is abnormal. The predetermined time period for Hi is longer than the time period from when the wiper motor 100 starts braking until the potential of the Hi wiring 37 becomes equal to or lower than the Hi threshold potential V_Hi_th in case where the FET of the IPD 57 is normal. Furthermore, the predetermined time period for Hi is set through experiments, simulations, or the like so as to achieve such a result.

When the time period from the start of braking of the wiper motor 100 until the potential of the Hi wiring 37 becomes equal to or less than the Hi threshold potential V_Hi_th is longer than the predetermined time period for Hi, the time period is long due to an abnormality in the FET of the IPD 57. Therefore, at this time, the controller 60 determines that the FET of the IPD 57 is abnormal. Further, when the time period from when the wiper motor 100 starts braking until the potential of the Hi wiring 37 becomes equal to or less than the Hi threshold potential V_Hi_th is shorter than the predetermined time period for Hi, the FET of the IPD 57 is normal. Therefore, at this time, the controller 60 determines that the FET of the IPD 57 is normal.

The controller 60 determines whether the FET of the IPD 57 is abnormal based on the time period until the potential of the La wiring 47 and the Hi wiring 37 becomes equal to or less than a predetermined threshold potential. For this reason, in the wiper drive device 30 of the present embodiment, it is easy to determine whether the FET of the IPD 57 is abnormal, compared with a case where the FET of the IPD 57 is determined as abnormal based on the threshold value determination only on the potentials of the Lo wiring 47 and the Hi wiring 37 connected to the wiper motor 100.

In addition, the wiper drive device 30 of the present embodiment also has the following effects.

Assume that the FET of the IPD 57 is turned on while the Lo FET 49 is turned on, due to a malfunction of the controller 60. At this time, overcurrent flows from the motor battery 14 to the second ground 82 via the motor fuse 18, the motor power supply terminal 33, the first motor diode 31, the second motor diode 32, the La coil 451, the Lo wiring 47 and the IPD 57. This overcurrent damages the FET of the IPD 57.

Therefore, the FET of the IPD 57 is turned on after the Lo FET 49 is turned off. This suppresses the flow of the overcurrent to the FET of the IPD 57, thereby suppressing damage to the FET of the IPD 57.

Moreover, the protection circuit of the IPD 57 automatically turns off the FET of the IPD 57 when the FET of the IPD 57 is turned on while the Lo FET 49 is turned on. This suppresses the flow of the overcurrent to the FET of the IPD 57, thereby suppressing damage to the FET of the IPD 57.

(Other Embodiments)

The present disclosure is not limited to the above-described embodiment, and the above embodiment can be appropriately modified. In each of the above embodiments, it goes without saying that any element constituting the embodiment is not necessarily essential except the following cases: the case where it is explicitly stated that such element is particularly essential; and the case where it can be considered that such element is obviously essential in principle.

The controller, the determination unit and the techniques thereof according to the present disclosure may be implemented by one or more special-purposed computers. Such a special-purposed computer may be provided by configuring a processor and a memory programmed to execute one or more functions embodied by a computer program. Alternatively, the controller, the determination unit and the like and the method thereof described in the present disclosure may be achieved by a dedicated computer provided by configuring a processor constituted by one or more dedicated hardware logic circuits. Alternatively, the controller, the determination unit and the like and the method thereof described in the present disclosure may be achieved by one or more dedicated computers constituted by a combination of a processor and a memory programmed to execute one or a plurality of functions and a processor constituted by one or more hardware logic circuits. The computer program may be stored in a computer-readable non-transition tangible storage medium as an instruction executed by a computer.

In the above embodiment, the Hi FET 39, the Lo FET 49 and the FET of the IPD 57 are exemplified by MOSFET as switching element. The switching element is not limited to MOSFET, and may be other elements such as IGBT.

In the above embodiment, the controller 60 controls the on/off of the Lo FET 49 and the FET of the IPD 57 to set the operating state of the wiper to the intermittent mode. The controller 60 is not limited to switching the wiper operation state to the intermittent mode by controlling the on/off of the Lo FET 49 and the FET of the IPD 57. For example, the drain of the FET of the IPD 57 may be connected to the Hi wiring 37, and the controller 60 may control the on/off of the Hi FET 39 and the FET of the IPD 57, thereby causing the wiper to operate in the intermittent mode.

In the above embodiment, the controller 60 determines abnormality in the FET of the IPD 57 based on the time period required for the potential of the Lo wiring 47 and the Hi wiring 37 to become equal to or lower than the predetermined potential. The controller 60 is not limited to determining abnormality of the FET of the IPD 57 based on the time period until the potential of the Lo wiring 47 and the Hi wiring 37 become equal to or lower than the predetermined potential. For example, the controller 60 may determine that the FET of the IPD 57 is abnormal when the amount of decrease per unit time in the potential of the Lo wiring 47 and the Hi wiring 37 after the wiper motor 100 starts braking is equal to or less than a predetermined amount that is smaller than the amount of decrease in case where the FET of the IPD 57 is normal.

What is claimed is:

1. A wiper drive device configured to drive a wiper by rotating a wiper motor, the wiper drive device comprising:
   a wiring connected to the wiper motor;
   a drive element configured to apply a voltage to the wiper motor through the wiring by being turned on so as to rotate the wiper motor;
   a braking element configured to brake the wiper motor by being turned on when the drive element is turned off so as to flow a current corresponding to a rotational energy of the wiper motor; and
   a determination unit configured to determine that the braking element is abnormal when a time period from when the wiper motor is braked to when an electric potential of the wiring becomes equal to or less than a predetermined threshold potential is longer than a predetermined value which is the time period in case where the braking element is normal.

2. The wiper drive device according to claim 1, wherein the braking element is turned on after the drive element is turned off.

3. The wiper drive device according to claim 1, wherein the braking element is automatically turned off when the braking element is turned on while the drive element is turned on.

4. A wiper drive device configured to drive a wiper by rotating a wiper motor, the wiper drive device comprising:
   a wiring connected to the wiper motor;
   a drive element configured to apply a voltage to the wiper motor through the wiring by being turned on so as to rotate the wiper motor;
   a braking element configured to brake the wiper motor by being turned on when the drive element is turned off so as to flow a current corresponding to a rotational energy of the wiper motor; and
   a determination unit configured to determine that the braking element is abnormal when an amount of decrease in an electric potential of the wiring per unit time after braking the wiper motor is equal to or less than a predetermined value smaller than the amount of decrease in case where the braking element is normal.

* * * * *